Nov. 25, 1969 J. M. BROWNLOW 3,480,522

METHOD OF MAKING MAGNETIC THIN FILM DEVICE

Filed Aug. 18, 1966 2 Sheets-Sheet 1

INVENTOR
JAMES M. BROWNLOW

BY John E. Dougherty Jr.

ATTORNEY 3,480,522

METHOD OF MAKING MAGNETIC THIN FILM DEVICE

James M. Brownlow, Crompond, N.Y., assignor to International Business Machines Corporation, Armonk, N.Y., a corporation of New York Filed Aug. 18, 1966, Ser. No. 573,417
Int. Cl. C23b *5/50;* C22c *39/12*
U.S. Cl. 204—40 18 Claims

ABSTRACT OF THE DISCLOSURE

The magnetic nickel iron film element is plated from a relatively dilute aqueous bath. A pulse plating technique is employed with a series of current pulses being applied to the bath and the bath being agitated only during the time between current pulses The bath includes, in addition to the nickel and iron ions, copper ions. Each current pulse plates two layers. The first layer is a nickel iron alloy which is rich in copper and is non-magnetic and the second layer is a nickel iron alloy which has a low percentage of copper and is magnetic. The magnetic storage element includes a plurality of such alternate magnetic and non magnetic layers.

The present invention relates to magnetic film devices and more particularly to improved magnetic alloy thin film structures as well as methods of fabricating alloy magnetic thin film structures.

Though magnetic film structures have many useful applications outside the computer field, a principal commercial use of these structures is in large scale digital computers and within computers the primary use of devices fabricated using magnetic films is in large scale memories. Further though both thick and thin film type devices have been developed for computer memory applications, by far the most significant use, both present and contemplated, is in anisotropic thin magnetic film elements. By the term anisotropic it is meant that the films are so prepared that the magnetic moments in the film, in the absence of an applied field, align themselves parallel to a direction in the film usually termed the easy axis Magnetic films of this type which are termed thin films usually have a thickness less than 10,000 angstroms, and can have the magnetic moments switched from one orientation to another by high speed rotation during which process the film behaves essentially as a single magnetic domain. The present invention, both as to structure and method, is not limited ot anisoptric thin films used in memory applications, but since the principal use of magnetic films is in this area, this is the principal application of the invention as described herein and illustrated by the preferred embodiments disclosed.

Presently the most widely used technology for preparing magnetic thin film memory devices is vacuum evaporation. Though commercially successful memories have been fabricated using this technology, the technology is a rather complex one and the necessary equipment is expensive. Further, because of the very nature of the vacuum evaporation apparatus the fabrication problems increase markedly as the size of the memory plane which is being fabricated is increased, since the memory applications in which the films are used require uniformly of magnetic characteristics within very limited tolerances across the entire memory plane. More specifically it is necessary that the anisotropy field $H_k$ for the film, the coercive force $H_c$, the skew of the easy axis across the film, and the dispersion of the magnetization around the easy axis be kept within very critical tolerances across the entire film as it is fabricated. It is also necessary that the magnetostriction of the films be essentially zero throughout the entire film plane.

Once the plane is completed by the addition of the necessary drive and sense conductors, other problems such as creep and demagnetizing effects are encountered in operating the films in the memory. This has led to the development of more complex film structures which again further complicate the original fabrication procedures. Thus, for example, though memories of this type have been built using only a single magnetic film, because of the above mentioned problems increased attention and development has been centered on coupled film structures. Further, rather than each film being uniform throughout laminated films have been fabricated which include two magnetic layers of an alloy such as permolly (NiFe) separated by a layer of a different nonmagnetic material such as copper or gold. Devices of this latter type have not been widely used because of the necessity of separate additional fabrication steps required by the use of different materials.

In accordance with the principles of the present invention a new and improved magnetic thin film structure is provided and this structure is usable both in flat and coupled film memories. This structure, which as is illustrated by the embodiments disclosed herein, is a laminated film which is very thin, and includes a large number of alternate layers of magnetic and nonmagnetic material. The magnetic layers are in the preferred embodiment a NiFe alloy and the nonmagnetic layers also include an NiFe alloy. In the nonmagnetic layers copper is included in a sufficiently high percentage to quench the magnetism of these layers, but in the magnetic layer though copper is also present in the alloy, the percentage present is sufficiently small that good magnetic characteristics are achieved.

Again in accordance with the principles of the present invention an improved electroplating method of fabricating magnetic thin film devices is realized and this method is particularly useful in producing structures of the above described type. In the practice of this method a relatively dilute aqueous bath including Ni, Fe and Cu ions is used. The film is plated on a smooth planar copper substrate cathode in the bath. The plating current is one at which all these ions plate out on the substrate and the current is controlled to provide a series of current pulses through the bath and each current pulse causes two layers, one nonmagnetic and one magnetic to be plated. It has been known that the presence of Cu is useful in controlling plating of NiFe to produce films shaving essentially zero magnetostriction (see for example an article by C. LeMehauté and E. Rocher beginning at page 141 in the March 1965 issue of the IBM Research and Development Journal) and this fact is employed to advantage in the present method. However, as is well known in the art of plating NiFe alloys, concentration of the first layer plated when the current is applied is different from that of the subsequently deposited material which fact has made it difficult to plate NiFe having zero magnetostriction. In the practice of the present method two layers are plated with each pulse and the concentrations of the Ni, Fe and Cu are different in these two layers but since the first layer is rich in Cu and is essentially nonmagnetic and only the second layer which has a law Cu concentration is magnetic the finished laminated film structure is found to have essentially zero magnetostriction when the proper current density is selected. In order to achieve uniformity in the plated layers, it has been found that the bath should not be agitated during the actual plating but should be agitated only in the time between the plating pulses. Very uniform magnetic laminar magnetic films have been fabricated using this process which have very low dispersion and skew throughout the film and which exhibit uniform values of $H_k$ and $H_c$ in the ranges of these values which meet the requirements of commercial film memories.

Therefore it is an object of the present invention to provide a new and improved magnetic thin film structure and more specifically and improved laminated film structure which can be more easily fabricated to include even in an extremely thin film a large number of alternate layers of magnetic and nonmagnetic material.

It is a more specific object to provide improved laminated thin film structures of NiFeCu which include layers which have a low Cu concentration and are magnetic separated by layers having a high Cu concentration and are nonmagnetic.

A further and equally important object is to provide an improved method of fabricating magnetic thin film structures and more specifically an improved method of electroplating NiFe alloy films.

It is a further object to provide an improved and economical method of fabricating large area magnetic thin film structures which have uniform magnetic characteristics.

It is a particular object to provide a method of electroplating NiFe alloy films which are very thin and which exhibit essentially zero magnetostriction.

Another object of the present invention is to provide a method of producing magnetic thin film structures of NiFe which include Cu and in which pulse plating with selective agitation is employed to produce a film structure having uniform magnetic characteristics.

A further object is to provide a method and proper electroplating bath to produce improved magnetic thin film structures.

The foregoing and other objects, features and advantages of the invention will be apparent from the following more particular description of preferred embodiments of the invention as illustrated in the accompanying drawings.

Figure 1:
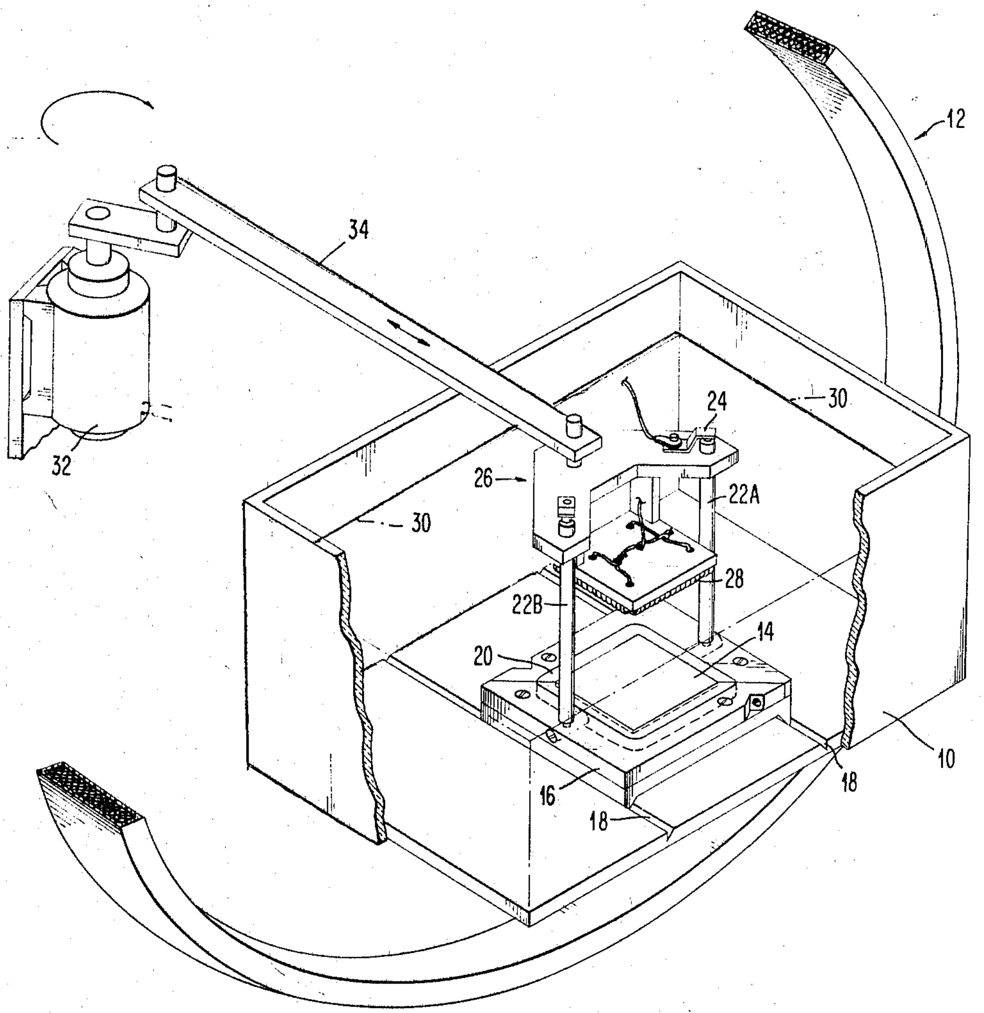
FIG. 1 is a perspective view showing the structure used in one mode of practicing the present invention.
Figure 2:
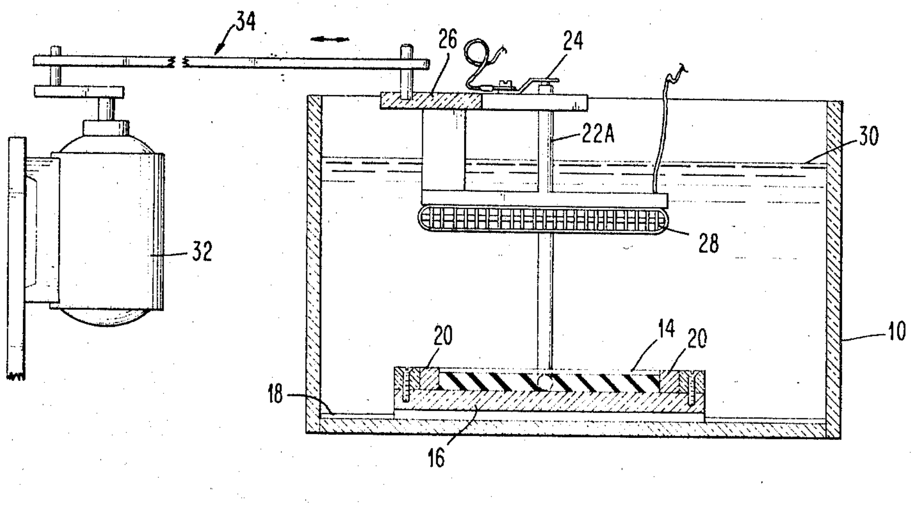
FIG. 2 is a side sectional view of the structure of FIG. 1.

In the views of FIGS. 1 and 2 which show the structure used in one mode of practicing the present invention, the bath container is designated 10 and around this container there is mounted a Helmoltz coil 12 which is energized during the plating operation to orient the magnetization in the plated film so that the fabrication film structure exhibits uniaxial anisotropy. The cathode in the bath is designated 14 and is in the form of an insulating board on which there is affixed a conductive sheet or coating. The upper surface of the conductive sheet is very smooth. Cathode substrate materials which have been found to be satisfactory are rolled copper sheets, evaporated silver and electrolessly deposited silver or cobalt. Cathode substrate 14 is mounted on a support block 16 which is supported in a pair of grooved channels 18 in the bottom of container 10. As is conventional this substrate 14 in block 16 is surrounded by a plating guard ring 20 to avoid uneven plating at the edges of the substrate. Electrical contact is made to the cathode substrate 14 through one of a pair of support posts 22A and 22B the outside surface of which are insulated since they are immersed in the electroplating bath. This post is connected at a terminal 24 to an electrical current source not shown. Mounted on the top of posts 22A and 22B is a carrier 26 for the anode for the bath which is designated 28. Anode 28 is formed of a copper winding on a nickel screen and the electrical connection to the anode is supplied by a wire connection to a current supply source not shown. The copper anode, being soluble, prevents the formation of trivalent Fe at the anode. Trivalent Fe does not plate and it is desirable to minimize or control the amount formed.

The bath level during plating is indicated by line 30 with the copper wire anode immersed in the bath and during the plating operation, specifically in the time between the application of plating pulses, the bath is agitated by a motor 32 which is connected to carrier 26 by linkage generally designated 34. When motor 32 is energized the entire structure is moved in the bath back and forth along the grooves 18 in which block 16 rides.

Figure 3:
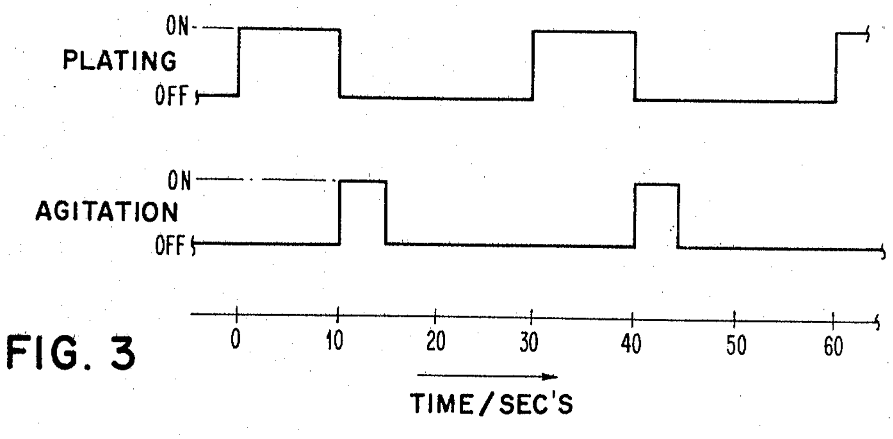
FIG. 3 is a timing diagram illustrating the manner in which the pulses are applied and the bath is agitated in one mode of practicing the invention.

The timing diagram shown in FIG. 3 illustrates the manner in which electrical pulses are applied to the structure of FIG. 1 to provide current pulses in the bath and the selective agitation motor 32. Each cycle of operation is about 30 seconds and each current pulse has a duration of about 10 seconds. The motor 32 is energized to agitate the bath at the termination of each current pulse and the agitation is for a period of about 4 seconds. The bath is then let come to equilibrium for a period of about 16 seconds before the next pulse is applied. This type of selective agitation, that is where the bath is agitated only during the time between current pulses and the bath is allowed to remain unagitated for a period before the aplication of the next current pulse has been found to produce superior magnetic films. If the bath is agitated during the actual plating, the resulting film is not as uniform in its characteristics. If there is no agitation, then the concentration of the bath immedaitely adjacent to the cathode is different at the beginning of each current pulse unless an inordinately long delay is provided between pulses in which case the previously deposited layer can be adversely affected by the bath itself during the delay. It should be noted that the actual plating itself produces a type of bath motion, here termed eddy currents, which are due to the electrochemical changes at the cathode surface and one of the functions of the agitation between pulses is to break up these eddy currents. If these eddies are not disrupted, it has been found that the electrodeposited layers are much less smooth and nonuniform. Though the width of the applied current pulses and the time between pulses does affect the composition of the deposited layer, good films have been made over a wide range of pulse conditions including pulse durations from 2 to 15 seconds and time between pulses from 5 to 20 seconds. The agitation preferably is produced immediately after the termination of one pulse and a period of at least half the time between pulses allowed after the agitation before the next pulse is applied.

Though the practice of the inventive method in its broadest sense is not limited to any specific electroplating bath, the best results thus far obtained in fabricating planar laminated magnetic thin film structures having uniform magnetic characteristics within the range required for use in large scale memory applications have been realized using the following constituents in the bath.

| | Low | High | Preferred |
|---|---|---|---|
| Demineralized $H_2O$, cc | 1,000 | 1,000 | 1,000 |
| Triton X-199 detergent, g | 0.2 | 0.6 | 0.6 |
| Saccharin, Na, g | 0.5 | 2.0 | 1.0 |
| Sulfamic Acid, g | 0.5 | 5.0 | 1.0 |
| Sodium Potassium Tartrate, g | 5.0 | 10.0 | 7.5 |
| $NiSO_4 \cdot 6H_2O$, g | 10.0 | 30.0 | 15.0 |
| $FeSO_4 \cdot 7H_2O$, g | 1.0 | 8.0 | 1.75 |
| $CuSO_4 \cdot 5H_2O$, g | 0,5 | 3,0 | 1.75 |

In the above baths the concentration of Ni, Fe and Cu ions in grams per liter is set forth below.

| | Low | High | Preferred |
|---|---|---|---|
| Ni ions | 2.0 | 6.0 | 3.0 |
| Fe ions | 0.2 | 1.6 | 0.35 |
| Cu ions | 0.1 | 0.6 | 0.35 |

The buffer material sodium potassium tartrate was found to produce lowest dispersion in film structures having thicknesses of about 1000 Angstroms. In this bath the Ph is about 3.4 but Ph values somewhat lower and slightly higher can be used. For example ammonium citrate dibasic has been successfully used as a substitute for the tartrate of the baths described above in which case the Ph of the bath was 3.9.

It should be noted that the baths have a relatively low concentration of Ni and Fe ions and that the ratio of Ni to Fe ions in the bath is smaller than in most concentrated NiFe baths. At the same time the Cu ion concentration is relatively high.

The density of the plating current applied with the above baths using the pulse plating techniques described above were from 2 to 5 milliamperes per $cm.^2$ of the substrate area to be plated, the preferable current density being 4 milliamperes per $cm.^2$. It should be noted that by controlling the plating current to be lower than these values one or more layers of essentially pure Cu can be plated on top of the thin film structure.

Figure 4:
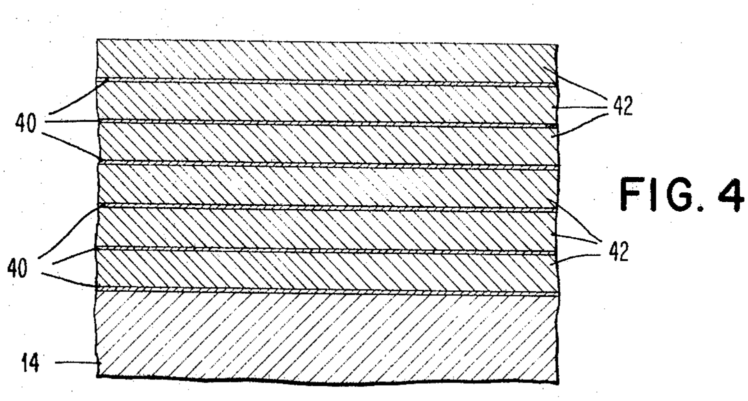
FIG. 4 is a cross section of a portion of the novel magnetic thin film structure including alternate layers of magnetic and non-magnetic material.

The novel laminated type of thin film structure which is produced using the process described above is illustrated in FIG. 4. In this figure only a portion of the thin film structure is illustrated and the lowermost layer shown is the upper surface of the conductive substrate 14 on which the film structure is plated. During the application of the first pulse a very thin nonmagnetic layer 40 which is rich in Cu is first plated and then a thicker layer 42 which contains less Cu and is magnetic is plated on top of the first layers. Each subsequently applied pulse produces a similar pair of nonmagnetic and magnetic layers 40 and 42. The thickness of the layers 40 remains the same for a given current density and the thickness of the layers 42 for a given current density increases as the duration of the applied pulses is increased. The number of layers deposited is of course determined by the number of pulses applied. This type of structure wherein the thin film is formed of a series of layers of magnetic and nonmagnetic layers has been found to be advantageous in memory applications. Specifically, the laminated structure is less susceptible to the creep phenomenon which can result in the loss of stored information. In the structure of the present invention the alloy of magnetic layers 42 includes Ni, Fe and Cu with the Cu content being less than 30% and preferably in the vicinity of 10%. When the content of the Cu in a NiFeCu alloy exceeds 30% the magnetism of the alloy is quenched and this is the condition realized in nonmagnetic layers 40. Thus though the entire structure of the film is a NiFe alloy, the alloy in layers 40 is rich in Cu which quenches the magnetism in these layers and the layers 42 contain a sufficiently small amount of Cu that these layers exhibit good magnetic characteristics. At the same time the use of the Cu in the bath and in the resulting magnetic alloy allows layers 42 to be prepared to exhibit essentially zero magnetostriction over a much wider range of concentrations of the elements in the alloy than is the case in pure NiFe alloys.

This latter fact, the sensitivity of the magnetrostriction of a pure NiFe alloy to the concentration of the elements in the alloy, illustrates another feature of the invention. This sensitivity has been a major problem in electroplating NiFe films for memory applications since when current is applied to a bath to plate NiFe, the Fe plates out initially at a very high rate and a first layer is plated which is richer in Fe than the 81% Ni, 19% Fe alloy which exhibits zero magnetostriction. In the present invention the use of a relatively high Cu ion concentration in the plating bath cause the first layer plated when the plating current is applied to be sufficiently rich in Cu that it is not magnetic and therefore the magnetostriction problem is avoided. Further these nonmagnetic layers serve the function of providing the desired laminated film structure.

The advantages of the invention are illustrated by the following examples of the details of the preparation of very thin magnetic thin film structures. Films having a thickness of about 1000 angstroms with magnetic layers 42 less than 200 angstroms thick and nonmagnetic layers 40 less than 50 angstroms thick have been prepared in accordance with the pulse plating method described above. By controlling the plating current these films have been prepared to include six of the layers 40 of magnetic material each having a thickness of about 150 angstroms and six of the separating nonmagnetic layers each having a thickness of about 15 angstroms. Films have been also prepared using thinner layers 42 of about 100 angstroms separated by nonmagnetic layers 40 of about 10 angstroms. Since the thickness of the magnetic layers is much greater than the nonmagnetic layers, by a factor of 10 to 1 the films are highly magnetic.

Though it is difficult with layers of this thickness to determine exactly the proportions of the constituents elements of each layer, analysis has shown that when a pulse is first applied the initial deposit is very rich in Cu, in fact a few Angstroms of pure Cu may deposit, after which the Cu content of the subsequently deposited material decreases sharply and at the same time the Ni content increases sharply until the Cu content is less than 30% and a magnetic alloy is achieved.

Indicative of the magnetic characteristics which have been obtained following the principles of the present invention are magnetic thin film structures having an area of 4x4 inches, and which are 1000 angstroms thick. These films contain the large number of very thin layers described above and exhibit essentially zero magnetostriction. Films of this type plated on a substrate formed by evaporating silver on glass have been prepared to exhibit essentially equal values of $H_c$ and $H_k$ of about 4 oersteds and both skew and dispersion has been measured to be less than 2°.

What is claimed is:

1. A process for fabricating magnetic devices comprising:

(a) providing an electroplating bath including ions of Ni, Fe and Cu;

(b) providing an anode and cathode in said bath, said cathode being an electrically conductive substrate;

(c) applying through said anode and cathode a series of current pulses;

(d) and agitating said bath only during the time between said current pulses.

2. The process of claim 1 wherein:

said bath is agitated after each current pulse is terminated and for a time less than half the time between the termination of one current pulse and application of the next current pulse.

3. The process of claim 2 wherein:

said bath is an aqueous bath and includes 2.0 to 6.0 g. per liter of Ni ions, 0.2 to 1.6 g. per litre of Fe ions, and 0.1 to 0.6 g. per liter of Cu ions.

4. The process of claim 3 wherein said bath includes sodium potassium tartrate.

5. The process of claim 4 wherein each of said current pulses is maintained for a time sufficient to plate on said cathode substrate a first essentially nonmagnetic layer and a second magnetic layer on top of said nonmagnetic layer.

6. The process of claim 5 wherein said anode is a copper anode.

7. A process for fabricating magnetic devices comprising:
   (a) providing an electroplating bath including ions of Ni, Fe and Cu;
   (b) providing an anode and cathode in said bath, said cathode being an electrically conductive substrate;
   (c) applying through said anode and cathode a series of current pulses;
   (d) each of said current pulses being maintained for a time sufficient to plate on said cathode a first layer which is essentially nonmagnetic and a second layer which is magnetic.

8. The process of claim 7 wherein the total thickness of said first and second layers is less than 200 angstroms.

9. The process of claim 7 wherein the thickness of said second layer is about 10 times the thickness of said first layer.

10. The process of claim 7 including the further step of agitating said bath only during the time between said current pulses.

11. The process of fabricating a magnetic film element comprising the steps of:
   (a) providing an electroplating bath including ions of Ni, Fe and Cu;
   (b) providing in said bath an anode and an electrically conductive cathode substrate on which said element is to be electroplated;
   (c) applying through said anode and cathode a controlled electroplating current to electroplate a plurality of layers on said substrate including at least two magnetic layers in which the Cu content is an amount less than 30% and another layer between said two magnetic layers in which the Cu content is greater than 30%.

12. The process of claim 11 wherein the applied current is controlled to include a series of current pulses;
   and each current pulse causes a monmagnetic layer and a magnetic layer to be plated on said cathode substrate.

13. The process of claim 12 including the further step of agitating said bath after each pulse is terminated for a time less than one-half the time between the termination of one pulse and the initiating of the next succeeding pulse.

14. The process of claim 11 wherein the applied current is controlled to provide at least a portion of said another layer in which the Cu content is greater than 50%.

15. A process for fabricating magnetic devices comprising the steps of:
   (a) providing a nickel iron electroplating bath;
   (b) providing an anode and cathode in said bath, said cathode being an electrically conductive substrate;
   (c) applying through said anode and cathode a series of current pulses;
   (d) and agitating said bath only during the time between said current pulses.

16. The process of claim 15 wherein:
   said bath is agitated after each current pulse is terminated and is agitated for a time less than half the time between the termination of one current pulse and application of the next current pulse.

17. The process of fabricating film elements comprising the steps of:
   (a) providing an aqueous electroplating bath including between 2.0 and 6.0 grams per liter of Ni ions, between 0.2 and 1.6 grams per liter of Fe ions and between 0.1 and 0.6 grams per liter of Cu ions;
   (b) providing an anode and cathode in said bath, said cathode being an electrically conductive substrate;
   (c) applying through said anode and cathode a series of current pulses;
   (d) and electrodepositing on said cathode a plurality of layers including at least two magnetic layers having copper in an amount less than 30% and a nonmagnetic layer between said two magnetic layers having a copper content greater than 30%.

18. The process of claim 17 wherein said bath includes about 3 grams per liter of Ni ions, about 0.35 grams per liter of Fe ions, and about 0.35 grams per liter of Cu ions.

References Cited

UNITED STATES PATENTS

| | | | |
|---|---|---|---|
| 1,527,734 | 2/1925 | Huggins | 204—45 |
| 2,515,192 | 7/1950 | Chester | 204—45 |
| 2,619,454 | 11/1952 | Zapponi. | |
| 3,348,931 | 10/1967 | Reekstin | 29—199 XR |
| 3,375,091 | 3/1968 | Felotkeller | 29—196.6 |

OTHER REFERENCES

Stout et al., Transactions of the Electro-Chemical Society, vol. 60, pp. 271, 280–288 and 295 (1931).

JOHN H. MACK, Primary Examiner

G. L. KAPLAN, Assistant Examiner

U.S. Cl. X.R.

29—183.5, 194; 204—43, 45, 273; 340—174